United States Patent
Han et al.

(10) Patent No.: US 10,925,697 B2
(45) Date of Patent: Feb. 23, 2021

(54) INTEGRATED HYBRID DENTAL IMPLANT

(71) Applicants: SEOUL NATIONAL UNIVERSITY R&DB FOUNDATION, Seoul (KR); THE OHIO STATE UNIVERSITY, Columbus, OH (US)

(72) Inventors: Jung-Suk Han, Seoul (KR); Do-Gyoon Kim, Dublin, OH (US)

(73) Assignees: SEOUL NATIONAL UNIVERSITY R&DB FOUNDATION, Seoul (KR); THE OHIO STATE UNIVERSITY, Columbus, OH (US)

(*) Notice: Subject to any disclaimer, the term of this patent is extended or adjusted under 35 U.S.C. 154(b) by 0 days.

(21) Appl. No.: 15/781,134

(22) PCT Filed: Dec. 13, 2016

(86) PCT No.: PCT/KR2016/014586
§ 371 (c)(1),
(2) Date: Jun. 3, 2018

(87) PCT Pub. No.: WO2017/105057
PCT Pub. Date: Jun. 22, 2017

(65) Prior Publication Data
US 2018/0344435 A1   Dec. 6, 2018

(30) Foreign Application Priority Data
Dec. 15, 2015 (KR) .......................... 10-2015-0178843

(51) Int. Cl.
*A61C 8/00* (2006.01)
*A61C 8/02* (2006.01)
(Continued)

(52) U.S. Cl.
CPC .......... *A61C 8/0093* (2013.01); *A61C 8/0006* (2013.01); *A61C 8/0022* (2013.01); *A61C 19/063* (2013.01); *A61C 13/225* (2013.01)

(58) Field of Classification Search
CPC ... A61C 8/0006; A61C 8/0092; A61C 8/0093; A61C 8/0098; A61C 8/0022
See application file for complete search history.

(56) References Cited

U.S. PATENT DOCUMENTS 4,671,768 A * 6/1987 Ton ...................... A61C 8/0018
433/173
2008/0118893 A1* 5/2008 Armellini ............ A61C 8/0022
433/174

(Continued)

FOREIGN PATENT DOCUMENTS

CN  101803957 A  8/2010
CN  102088926 A  6/2011
(Continued)

OTHER PUBLICATIONS

Zhao et al. "An injectable calcium phosphate-alignate hydrogel-umbilical cord mesenchymal stem cell paste for bone tissue engineering", Jun. 8, 2010, Biomaterials, 31 (2010) 6502-6510 (Year: 2010).*

*Primary Examiner* — Edward Moran
(74) *Attorney, Agent, or Firm* — Hultquist, PLLC; Steven J. Hultquist

(57) ABSTRACT

The present invention relates to an integrated hybrid dental implant, and more particularly, to an integrated hybrid dental implant in which an opening portion formed at a screw body to enable a drug to be injected into an implantation site of the implant, and the mechanical stability is excellent despite the presence of the opening portion. The integrated hybrid dental implant according to the present invention enables a drug to be supplied to the area around the implantation site (Continued)

so as to induce bone regeneration into the implant after the implant has been placed at a bone-deficient site, has an additional mechanical strength when bone grows into the side openings and hollow inner channel, and allows the screw body to be integrally formed with the prosthesis section (i.e., one piece) to exhibit more excellent mechanical strength so that the implant can be useful as a dental implant.

9 Claims, 7 Drawing Sheets
(6 of 7 Drawing Sheet(s) Filed in Color)

(51) Int. Cl.
*A61C 19/06* (2006.01)
*A61C 13/225* (2006.01)

(56) References Cited

U.S. PATENT DOCUMENTS

| 2010/0081109 A1 | 4/2010 | Schlottig et al. |
| 2012/0141955 A1 | 6/2012 | Kim |
| 2015/0230889 A1 | 8/2015 | Kim et al. |

FOREIGN PATENT DOCUMENTS

| CN | 102711658 A | 10/2012 |
| CN | 102824220 A | 12/2012 |
| CN | 103083097 A | 5/2013 |
| CN | 204655155 U | 9/2015 |
| EP | 0864299 A1 | 9/1998 |
| KR | 1020080023895 A | 3/2008 |
| KR | 1020120000235 A | 1/2012 |
| KR | 1020140143295 A | 12/2014 |

\* cited by examiner inner empty space (b)　　　　　　　(c)　　　　　　　(d)

(a)                    (b)

INTEGRATED HYBRID DENTAL IMPLANT

CROSS-REFERENCE TO RELATED APPLICATIONS

This application is a U.S. national phase under the provisions of 35 U.S.C. § 371 of International Patent Application No. PCT/KR2016/014586 filed Dec. 13, 2016, which in turn claims priority of Korean Patent Application No. 10-2015-0178843 filed Dec. 15, 2015. The disclosures of such international patent application and Korean priority patent application are hereby incorporated herein by reference in their respective entireties, for all purposes.

TECHNICAL FIELD

The present invention relates to an integrated hybrid dental implant, and more particularly, to an integrated hybrid dental implant in which openings formed at a screw body to enable a drug to be injected into an implantation site of the implant, and the mechanical stability is excellent despite the presence of the openings portion.

BACKGROUND ART

A dental implant is a "root" device used in dentistry to support restorations that resemble a tooth or group of teeth to replace missing teeth. The dental implants, abutments, and dental prostheses are collectively called dental restorations or implant systems that resemble a tooth or group of teeth (referred to as "restoration" or "implant system") as replacements for missing teeth. A dental implant generally appears similar to an actual tooth root and is placed within the bone of the jaw to replace the root of the missing tooth. After the implant surface fuses with the surrounding jaw bone (osseointegration), dental abutments and dental prostheses such as crowns, implant-supported bridges or dentures can be installed. The dental abutments and prostheses then allow a patient to use the restorations for chewing (also called masticatory loading).

The process of placing the dental implants into the jaw bone of a patient is called dental implantation, and it is a very vigorous surgical procedure, resulting in bone damage at the bone-implant interface. A relatively long healing period follows this dental implantation process, which lasts at least about two to three months and may extend to six months. During the healing period, (1) the bone damage is repaired and replaced with new bone tissues (active biological bone remodeling); and (2) direct bone ingrowth or fusion between the implant surface and the bone tissue surrounding the implant is also achieved (osseointegration). If the healing time is too short before any masticatory force is applied on the implant, the implant might risk failure because of the bone damage in the pre-existing interfacial bone, weak new bone tissues, and unstable bone-implant interface with partial osseointegration. The masticatory force applied on an insufficiently healed implant creates excessive micro-motion between bone and implant surface, resulting in fibrous tissue development at the interface which might block further osseointegration and cause eventual failure of the implant system.

To prevent or reduce any possible direct masticatory force being applied on the implant, the installed implant is protected under a healing cap during the healing period. After a sufficient healing period, a second surgery is conducted to install an abutment and a prosthesis (artificial tooth crown). The combination of these two surgeries is frequently used in an implant system that is involved in a dental replacement for the missing tooth.

Most patients who need the dental implantation have various levels of bone deficiency which contribute to intraoral complications that cause tooth loss due to early extraction of teeth or bone loss after the extraction. For example, tooth extraction and disuse atrophy arising from delayed treatment can lead to loss of the alveolar ridge. Segmental oral reconstruction surgeries are likely to result in substantial defects and disconnections in the mandibular bone. The extraction of a posterior maxillary tooth may occasionally make the floor of the maxillary sinus too thin. Sometimes, bone augmentation may not place implants at oral bone sites with too severe bone defects.

Bone grafting surgery is a popular method to treat the bone deficiency in many critical oral defects. Autologous bone has been accepted as an ideal material for grafting allogeneic grafts, which is obtained from human cadavers and animals. However, these bone materials bring the risks of infection and immune rejection. In addition, the degree of bone incorporation or growth through the bone grafting process is uncertain and unclear. Further, many clinical cases have reported post-implantation failures at the bone grafted sites after the bone grafting process. In addition, the grafting for bone augmentations may impose additional surgical steps for patients, increasing the overall treatment costs.

Many studies indicated that growth factors can be introduced to induce bone augmentation, and have suggested bone morphogenetic protein (BMP) as a material having the most potent ability for stimulating bone growth. However, a high BMP dose was shown to cause uncontrolled progress of bone augmentation next to the implant. In addition, a carrier is needed which can contain and deliver BMP molecules. Substantial marginal bone loss adjacent to implants can arise from oral bone disease, including osteoporosis and peri-implantitis under high impact loading of static occlusion and dynamic mastication. Revision surgeries are often required to treat these post-implantation complications. Thus, there is a need for the development of a new implantation strategy that can minimize the additional pre- and post-implantation surgeries.

Korean Patent Laid-Open Publication No. 2014-0143295 discloses a dental implant including an antimicrobial coating layer and a surface treatment method thereof. The invention disclosed in the above-mentioned Korean Patent describes that titania nanotubes are coated on the surface of the implant in order to prevent peri-implantitis, and a drug is adsorbed on the nanotube coating layer in order to avoid peri-implantitis with the aid of the drug eluted after the procedure of the implant. However, the above-described invention has a shortcoming in that the amount of the drug eluted is small to thereby decrease the antimicrobial effects and there may occur adhesion degradation between the implant and the alveolar bone by the nanotube coating.

U.S. Patent Publication No. 20120141955 discloses a hybrid dental implant having a screw body which includes a middle portion having an inner cavity and one or more side openings. The invention disclosed in the above-mentioned U.S. patent describes that a drug is supplied through the side openings to promote bone regeneration around the implant. However, the above-described invention has a drawback in that the side openings have a rectilinear shape to thereby degrade the strength of the implant, and the adhesion between the implant and the alveolar bone is weakened to thereby deteriorate the mechanical stability of the implant.

U.S. Patent Publication No. 20150230889 discloses a hybrid dental implant comprising a screw body having one or more side openings that extend while rotating in a helix-like shape. The invention disclosed in the above-mentioned U.S. patent describes that a drug injected into a middle portion through an open ceiling of an upper portion is supplied through the side openings to thereby accelerate bone regeneration around the implant. However, the above-described invention has a disadvantage in that a tooth connecting portion and the screw body portion are separated from each other by a masticatory impact, and the implant is manufactured in a separation type to decrease the mechanical stability. In addition, the injected drug spreads within a short time of period along with the injection, and as a result, sufficient time required to induce bone cell activation is not ensured.

Accordingly, the present inventors have made extensive efforts in order to solve the above-described problems, have developed a hybrid implant which includes a prosthesis section and a screw body integrally formed with the prosthesis section, the screw body including an upper portion with an open ceiling, a middle portion that is hollow or filled with a drug carrier, and a lower portion with a closed floor, and have implanted the implant, and as a result, have found that a drug can be injected into the area around the implantation site, and the implant has an excellent mechanical stability despite the presence of openings and exhibits more excellent mechanical strength through the integration of the screw body with the prosthesis section, thereby completing the present invention.

SUMMARY OF THE INVENTION

It is an object of the present invention to provide an integrated hybrid dental implant which enables a drug to be injected into the implantation site of the implant, has an excellent mechanical stability despite the presence of openings, and allows a screw body to be integrally formed with a prosthesis section to exhibit more excellent mechanical strength.

To achieve the above object, the present invention provides an integrated hybrid dental implant comprising:

(a) a screw body having an external thread formed on an external surface thereof; and (b) a prosthesis section connected at one side thereof to a tooth prosthesis and integrally configured at the other side thereof with the screw body, wherein the implant comprises an upper portion with an open ceiling, a middle portion having a hollow inner channel, and a lower portion with a closed floor, and wherein the hollow inner channel comprises:

(i) an upper end portion connected to the open ceiling, which is configured to receive one or more injectable bone inducing agents;

(ii) a lower end portion terminating at the closed floor; and (iii) one or more side openings formed to rotate at an angle across a plurality turns of the external thread into a longitudinal direction, the angle being in a range of 30° to 60°, wherein the dimensions of the side openings are designed to enable bone ingrowth into the hollow inner channel of the middle portion or bone outgrowth from the hollow inner channel to the surrounding bone, and the side openings are fluidically connected with the hollow inner channel of the middle portion, and wherein the hollow inner channel of the implant comprises a drug carrier embedded therein to enable a continuous drug supply.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

EXPLANATION ON SYMBOL

Figure 1:
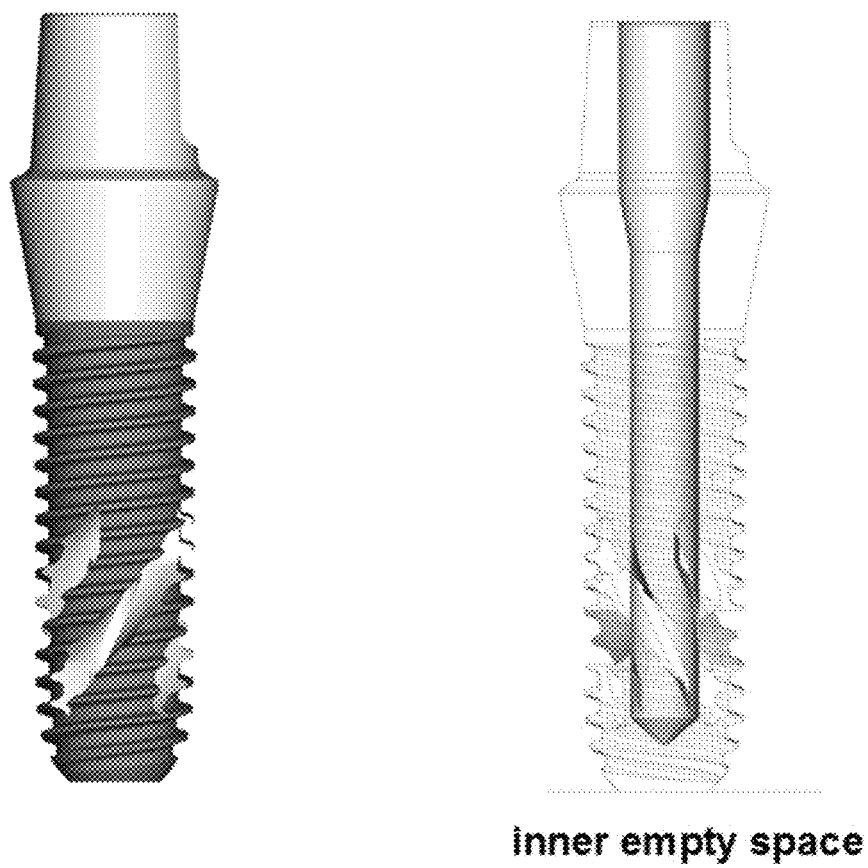
FIG. 1 is a perspective view showing an embodiment of a hybrid dental implant in accordance with the invention.

20: longitudinal central axis
25: radial axis
100: implant
101: screw body
102: upper portion
102a: outer surface of upper portion
102b: upper end of upper portion
102c: lower end of upper portion
103: middle portion
103a: outer surface of middle portion
103b: upper end of middle portion
103c: lower end of middle portion
104: lower portion
104a: outer surface of lower portion
104b: upper end of lower portion
104c: lower end of lower portion
106: side opening
106a: upper end of side opening
106b: lower end of side opening
107: open ceiling
108: closed floor
109: external thread
110: hollow inner channel
110a: outer surface of hollow inner channel
111: turns of external threads
111a: spaces between turns of external threads
112: angle between openings
113: angle between openings and longitudinal axis of implant
114: angle between openings and threads
115: widths of rotating planes
117: abutment screw
118: plug-in screw
119: healing cap
125: rotating planes
127: implant shell
140: bone grown inside implant
150: PMMA
151: PMMA penetrated into implant
200: prosthesis section
200a: top end of prosthesis section
200b: bottom end of prosthesis section

BEST MODE FOR CARRYING OUT THE INVENTION

Unless defined otherwise, all the technical and scientific terms used herein have the same meaning as those generally understood by one of ordinary skill in the art to which the invention pertains. Generally, the nomenclature used herein and the experiment methods, which will be described below, are those well known and commonly employed in the art.

There exists a need to have a dental implant system that allows for simultaneous bone augmentation, and if needed, any post-implantation treatments. The present inventors have developed a hybrid dental implant which includes an open type prosthesis section configured to enable a drug to be injected into an implantation site, and a screw body integrally formed with the prosthesis section, the screw body including an upper portion integrated with the prosthesis section, a middle portion that is hollow or filled with a drug carrier, and a lower portion with a closed floor, and have performed an animal experiment using the hybrid dental implant. As a result, the present inventors have found that the hybrid dental implant is simple, inexpensive, and can induce bone regeneration without additional dental surgeries, and that has an excellent mechanical stability despite the presence of openings.

Therefore, the present invention is directed to an integrated hybrid dental implant comprising:

(a) a screw body having an external thread formed on an external surface thereof; and (b) a prosthesis section connected at one side thereof to a tooth prosthesis and integrally configured at the other side thereof with the screw body, wherein implant comprises an upper portion with an open ceiling, a middle portion having a hollow inner channel, and a lower portion with a closed floor, and wherein the hollow inner channel comprises:

(i) an upper end portion connected to the open ceiling, which is configured to receive one or more injectable bone inducing agents;

(ii) a lower end portion terminating at the closed floor; and (iii) one or more side openings formed to rotate at an angle across a plurality turns of the external thread into a longitudinal direction, the angle being in a range of 30° to 60°, wherein the dimensions of the side openings are designed to enable bone ingrowth into the hollow inner channel of the middle portion or bone outgrowth from the hollow inner channel to the surrounding bone, and the side openings are fluidically connected with the hollow inner channel of the middle portion, and wherein the hollow inner channel of the implant comprises a drug carrier embedded therein to enable a continuous drug supply.

The integrated hybrid dental implant according to the present invention allows for injection of the effective bone inducing agents to accelerate bone regeneration, and preferably, bone inducing agents capable of treating oral complications associated with the implant without surgical intervention, while the implant system maintains its role in bearing masticatory loading after the implantation process. The integrated hybrid dental implant has not only a functional scaffold for injecting bone augmentation agents or other medical agents to promote bone regeneration within and around the dental implant during the post-implantation healing period without any additional surgeries, but also functions as a dental implant.

In addition, the integrated hybrid dental implant according to the present invention provides a better long-term mechanical stability of the implant system. For purposes of the present invention, the bone inducing agent can also be referred to as "bone growth factors," including one or more bone morphogenetic proteins (BMP). Further, a drug carrier can be embedded in the hollow inner channel of the implant to enable a continuous drug supply, if necessary.

The integrated hybrid dental implant according to the present invention may include a screw body having one or more external threads. The screw body integrated with the prosthesis section includes an upper portion with an open ceiling, a middle portion having a hollow inner channel, and a lower portion with a closed floor. The hollow inner channel of the middle portion includes an upper end portion connected to the open ceiling, which is configured to receive one or more injectable bone inducing agents. In one embodiment, additional medical agents can be injected prior to, during, or after dental implantation. Preferably, the hollow inner channel of the middle portion has a diameter ranging from about 0.5 mm to about 2.0 mm, more preferably about 1.0 mm to about 1.5 mm.

The integrated hybrid dental implant according to the present invention a prosthesis section connected at one side thereof to a tooth prosthesis and integrally formed at the other side thereof with the screw body. The prosthesis section is generally screw-engaged to the screw body, but the screw-engagement therebetween may be loosened by a masticatory impact to cause movement of the implant, contributing to peri-implantitis. Thus, preferably, the screw body and the prosthesis section are manufactured in an integrated manner. In addition, the prosthesis section include an inner central channel connected with the middle portion having the hollow inner channel of the screw body so that medicinal agents or bone inducing agents can be injected into an opening formed on one side of the prosthesis section. Further, a drug carrier can be embedded in the hollow inner channel of the implant to enable a continuous drug supply, if necessary.

In the present invention, the side openings extend from the hollow inner channel of the middle portion, rotating at an angle across a plurality turns of the external thread into a longitudinal direction, the angle being in a range of 30° to 60°, preferably 25° to 50°, relative to the turns of the external thread. The dimensions of the side openings may be designed to enable bone or bone tissue ingrowth into the hollow inner channel of the middle portion and bone outgrowth from the hollow inner channel to the surrounding bone. Preferably, the side openings are of a helix-like construction (see FIGS. 1 to 3), having rotating planes 125 in the longitudinal direction 21 along the longitudinal axis 20 and in the radial direction 25. In the radial direction, the rotating planes may be substantially parallel to each other with the width at the inner surface of the screw body substantially the same as the width at the outer surface of the screw body. The widths 115 of the rotating planes 125 of the side opening may be preferably in the range of about 0.6 mm to 1.5 mm.

Preferably, the upper portion, the middle portion, and the lower portion of the screw body are located successively along the length of the screw body in a longitudinal direction. The upper portion is integrally connected with the prosthesis section, and may occupy the upper 40% to 50% of the length of the implant other than the prosthesis section. The middle portion adjacent to the upper portion may occupy the middle 40% to 50% of the length of the implant other than the prosthesis section, and the lower portion adjacent to the middle portion may occupy the lower 10% to 20% of the length of the implant other than the prosthesis section.

In the present invention, preferably, the lower portion has a conical shape, and may have one or more self-tapping cuts at a front end thereof.

In the present invention, the upper portion is integrally formed with the prosthesis section. Preferably, the upper portion further comprises a plug-in screw connected to the middle portion having the hollow inner channel to inject bone inducing agents and/or therapeutic agents after the implantation. The plug-in screw serves to block a bacterial infection pathway by an open upper structure after the implantation of the implant, and serves to open the inner channel of the implant, if necessary.

In the present invention, the bone inducing agents preferably include one or more bone morphogenetic proteins. The bone inducing agents are preferably loaded onto a hydrogel, which can then be injected or introduced into the hollow inner channel of the middle portion during and/or after the implantation. The bone inducing agents and/or therapeutic agents can be injected or introduced into the hydrogel after the implantation periodically without additional surgeries. The combination of the loaded hydrogel and the dental implant allows for controlled delivery of bone inducing agents and other therapeutic agents to enable bone regeneration in a controlled fashion to allow for bone ingrowth into the hollow inner channel of the middle portion and bone outgrowth from the hollow inner channel into the surrounding bone. Any carrier other than the hydrogel can be filled in the hollow inner channel.

The present invention provides an integrated hybrid dental implant including a hollow inner channel having one or more side openings, a screw body integrally formed with a prosthesis section having an open top end, a middle portion having the side openings formed therein, and a lower portion. Bone inducing agents and other medication can be introduced into the screw body of the implant through the hollow inner channel, and the bone regeneration or augmentation can be achieved inside of the hollow inner channel through the side openings. Osseointegration of the dental implant progresses from the hollow inner channel to the surrounding bone. The implant may preferably include a screw body having one or more external threads. In this case, the shape of the screw body can be used without limitations. In addition, the implant surfaces may be modified by plasma spraying, anodizing, etching, or sandblasting to increase the surface area and osseointegration potential of the implant.

In the present invention, the integrated hybrid dental implant is installed by integration of the screw body with the prosthesis section 200 at one side thereof. The screw body and the prosthesis section are generally screw-engaged to each other, but the screw-engagement therebetween may be loosened by a masticatory impact to cause movement of the implant, contributing to peri-implantitis. Thus, preferably, the screw body 101 and the prosthesis section 200 are manufactured in an integrated manner. In addition, the prosthesis section include an inner central channel connected with the middle portion having the hollow inner channel of the screw body so that medicinal agents or bone inducing agents can be injected into an opening formed on one side of the prosthesis section. A dental prosthesis is connected to the prosthesis section without any movements using bone cement after the implantation.

Figure 2:
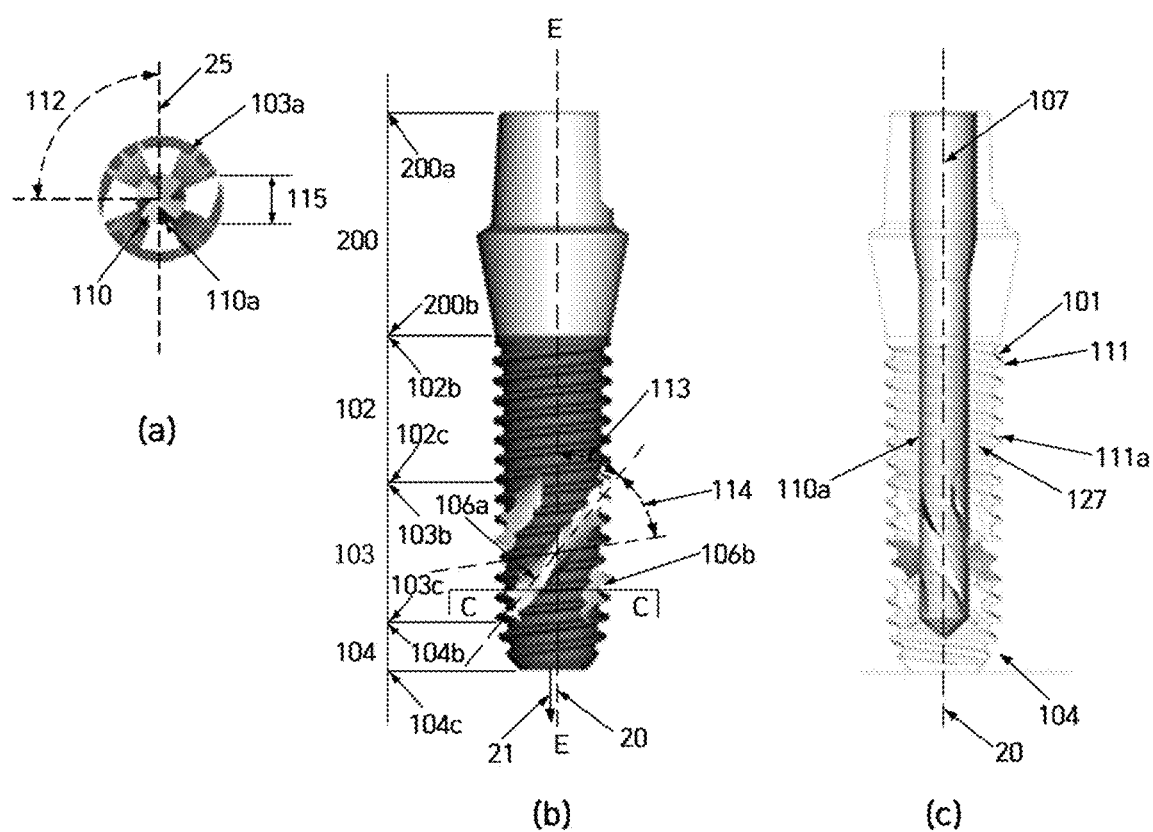
FIG. 2 shows views of the hybrid dental implant of FIG. 1 when viewed from various directions: (a) is a transverse cross-sectional view taken along the line C-C of (b), (b) is a side view showing the hybrid dental implant of FIG. 1, and (c) is a longitudinal side cross-sectional view taken along the line E-E of (b).

In the present invention, Preferably, the body of the dental implant 100 (as shown in FIGS. 1 to 4) has a screw body 101 formed with at least one external thread 109 with a plurality of turns rotating, preferably substantially symmetrically, relative to the longitudinal axis. The screw body 101 has an upper portion 102, a middle portion 103, and a lower portion 104 successively in the longitudinal direction of the screw body 101. The upper portion 102 has an open ceiling 107 configured to receive one or more injectable bone inducing agents, preferably also to include other medicinal agents, such as anti-TNF-α antibody. The upper portion 102 extends in the longitudinal direction 21 from the upper end 102b of the screw body 101 to the lower end 102c of the upper portion. Preferably, the upper portion 102 occupies the upper 40 to 50% of the length of the implant other than the prosthesis section, starting from the upper end 102b and ending to the lower end 102c of the upper portion 102, as shown in FIG. 1. More preferably, the upper portion 102 can have a length in the range of about 4 mm to 5 mm in the longitudinal direction. The middle portion 103 ranges from the upper end 103b of the middle portion 103, which is close to or adjacent to the lower end 102c of the upper portion 102, to the lower end 103c of the middle portion 103, and the upper portion 102 occupies the middle 40 to 50% of the length of the implant other than the prosthesis section in the longitudinal direction. The beginning end 106a of the side opening 106 is adjacent to or close to the beginning end 103b of the middle portion 103 while the lower end 106b of the side opening 106 is closed to or at the lower end 103c of the middle portion 103. The lower portion 104 ranges from the upper end 104b of the lower portion 104 to the ending tip (or lower end) 104c of the lower portion 104, and occupies about 10% to about 20% of the implant other than the prosthesis section. The closed floor 108 is adjacent to or at the beginning end 104b of the lower portion 104. The outer surfaces 102a and 103a of the upper portion 102 and the middle portion 103 are cylindrical and coaxial relative to the longitudinal axis 20. The outer surface 104a of the lower portion 104 may preferably have a conical shape with a tapered end as shown in FIGS. 1 to 4.

In the present invention, the middle portion 103 may have the hollow inner channel 110 with one or more helix-shaped side openings 106, and the hollow inner channel 110 may extend to the open ceiling. The hollow inner channel 110 is shaped to allow an injectable bone inducing agent to be introduced through the opening ceiling 107 of the upper portion 102 of the screw body 101 into the side openings 106 embedded in the middle portion 103, and the hollow inner channel 110 terminates at the closed floor 108 of the lower portion 104. The hollow inner channel 110 is enveloped by a shell 127, which extends from the outer perimeter 110a of the hollow inner channel 110 (which is an inner surface of the middle portion) to the outer surface 103a of the middle portion 103, which accounts for the thickness of the shell 127. The outer surface 103a of the middle portion 103 is composed of the turns 111 of the external threads 109 and the spaces 111a between the turns of the external threads 109. The diameter of the hollow inner channel (also referred to as the size of the outer perimeter 110a of the hollow inner channel 110) is preferably in a range of about 0.5 to about 2.0 mm, preferably in a range of 1.0 mm to 1.5 mm. The shell 127 may preferably have a thickness of at least about 2 mm to about 5 or 6 mm depending on the size of the implant. A typical dental implant size is about 3.5 mm to 5.0 mm wide and about 10 mm to 15 mm long.

In the present invention, the side openings 106 extend angularly in a radial direction 25 and in a peripheral direction from the hollow inner channel 110 in the middle portion 103, and transverse across a plurality of turns 111 of the external threads 109 at an angle relative to the longitudinal axis 20. Preferably, the side opening 106 rotates around the longitudinal axis 20 in the longitudinal direction 21 in the middle portion 103 at a given angle 113 relative to the longitudinal axis 20, preferably in a range of 25° to 50°, most preferably at 45°, and at an angle 114 relative to the turns 111 of the external threads 109 in a range of 30° to 60°, preferably in a range of 25° to 50°, most preferably at 45°. The two subsequent rotating turns 106a and 106b of the side opening 106 stretch each other in a peripheral direction at an angle 112 in a range of 70° to 100°, preferably at an angle 112 of about 90° (see FIG. 2(a)). Preferably, the side openings are of a helix-like construction (FIGS. 1 to 4), having rotating planes 125 in the longitudinal direction 21 along the longitudinal axis 20 and in the radial direction 25. In the radial direction, the rotating planes are substantially parallel to each other with the width at the inner surface of the screw body, which is substantially the same as the width at the outer surface of the screw body. The widths 115 of the rotating planes 125 of the side opening is preferably in the range of about 0.6 mm to 1.5 mm.

That is, the width 115 of the rotating plane is about 0.6 mm or more, or less than 1.5 mm, preferably in the range of 0.7 to 0.9 mm, and in one embodiment, the width 115 is about 0.79 mm. In one embodiment, there is one side opening 106 with multiple turns 106a and 106b, etc., preferably rotating in the middle portion 103 of the screw body 101 in a single-stranded helical manner. In some other embodiments, two or more side openings 106 are formed in a helical shape along the shell 127 of the middle portion.

In the present invention, the dimensions of the side openings 106 are designed such that that they enable the bone inducing agents to induce bone tissue regeneration to promote bone ingrowth through the side openings 106 into the hollow inner channel 110 and bone outgrowth from the hollow inner channel 110 to the surrounding bone so that the bone contact at the implant site can be restored or augmented sufficiently for osseointegration to enable successful implantation of the hybrid implant 100. At the same time, the dimensions of the side openings 106 are designed to maintain the stability of the implant 100 so that the implant 100 can withstand the impact of insertion into the dental implant site and subsequent masticatory loading from chewing.

In the present invention, the side openings are designed to deliver effective agents to induce bone regeneration. It is anticipated that bone ingrowth into the openings occurs while simultaneously integrating the implant threads. The side openings transverse across the implant threads at an angle ranging from 30° to 60° relative to the turns of the thread, the hollow inner channel has a diameter in the range of about 0.5 mm to about 2.0 mm, and sufficient turns and spacing of the implant threads between openings are maintained to allow for bone tissue regeneration while maintaining structural stability to sustain bone implantation.

Moreover, the hybrid implant system can be used for an excellent scaffold or drug delivery device for bone regeneration and other medical treatment during the post-implantation healing period, which will provide a better long-term mechanical stability of the implant system.

The dental implant of the present invention may be made of titanium or other suitable biocompatible materials. Titanium is a preferred material because the bone is observed to adhere to titanium surfaces ("osseointegration"). Suitable titanium can be pure titanium or a titanium alloy. Commercially available pure titanium is divided into four grades depending upon the amount of carbon and iron contained therein. The commercially available titanium alloy is grade 5 titanium, Titanium 6AL-4V (signifying the titanium alloy containing 6% aluminum and 4% vanadium), which offers similar osseointegration levels to that of commercially pure titanium with better tensile strength and fracture resistance.

In the present invention, the implant 100 is intended to be inserted into a bored hole in the jaw bone for permanent anchoring of artificial teeth, tooth bridges and other dental prostheses. The insertion starts with screwing the lower portion 104 of the implant into the bore hole until the entire implant, including the upper portion 102, is screwed into the bore hole of the jaw bone. Preferably, the dental implant have a shape which assist in the insertion of the implant, such as substantially frustoconical, substantially cylindrical (FIGS. 1c-1e), or any other suitable shape(s). For example, the frustoconical shape with tapering threads allows the front end to be screwed into the pre-prepared bone hole more easily and provides tighter insertion or coupling with the bone initially. Therefore, the initial tight coupling of the outer threaded parts of the implant with the adjacent bone can provide the initial mechanical stability of the implant during the healing period. For the purpose of this invention, the bone cement can be added to augment this initial stability.

As used herein, the phrase "outer threaded parts of the implant" can be interchangeably called "the threaded parts of the implant," "implant threads," or "screw threads".

Figure 3:
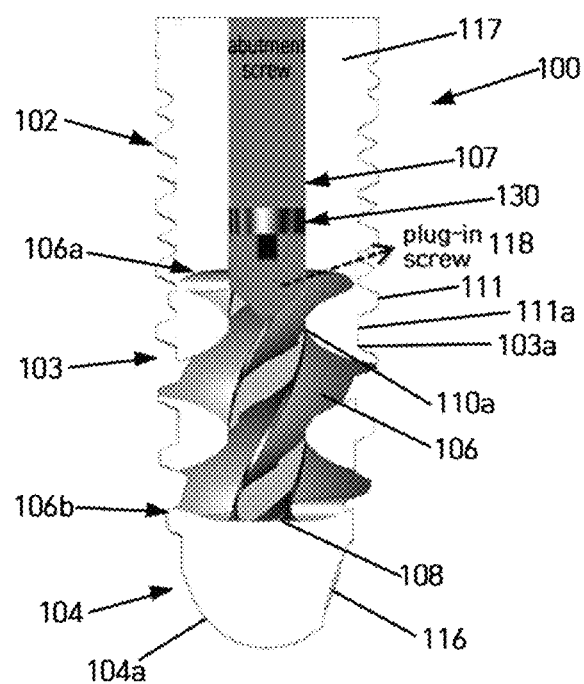
FIG. 3 is a side cross-sectional view of a screw body of the hybrid dental implant.
Figure 4:
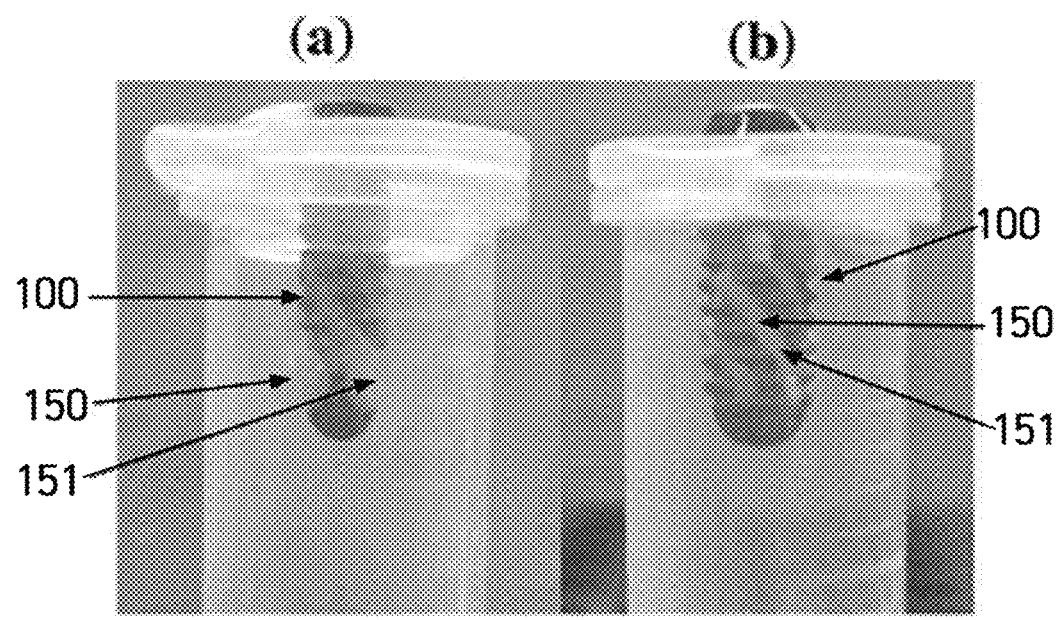
FIG. 4 in image (a) shows the injection of bone inducing agents (or bone growth factors) loaded hydrogels into the implant of FIG. 1 in a blood analog solution immediately after the injection, and in image (b) shows the injection of bone inducing agents (or both growth factors) loaded hydrogels into the implant of FIG. 1 in a blood analog solution after partial degradation.

In the present invention, the upper portion 102 has an optional collar and an attachment means for attaching a dental prosthesis thereto. As shown in FIGS. 1-4, the attachment means is the open ceiling 107 of the upper portion 102, through which bone inducing agents and/or other medicinal agents can be introduced. The open ceiling is preferably internally threaded to accept threaded inserts, such as an abutment screw 117 and an additional plug-in screw 118 below the abutment screw 117 to prevent an unwanted foreign substance from invading through the hollow inner channel 110 during implantation surgery, as shown in FIG. 3. This double screw system can prevent any infection through the hollow inner channel when the abutment screw is loosened during post-implantation therapeutic agent loading. The plug-in screw 118 can be easily unplugged whenever injection of a therapeutic agent or a bone inducing agent is needed. There is a gap 130 between the abutment screw 117 and the plug-in screw 118, which disconnects direct transferring of the load from the abutment screw 117 to the plug-in screw 118 to decrease the risk of loosening of the plug-in screw 118. Antibiotics (one type of therapeutic agent) can be filled in the gap space 130 between the abutment screw 117 and the plug-in screw 118. The combination of the abutment screw 117 and the plug-in screw 118 can act together in some ways as a longer healing cap screw (can also be referred to as "healing cap") except for the double screw system has additional advantages such as the gap space 130. Similar to the tapered end of the healing cap screw 119 in FIG. 11, the tapered end of the plug-in screw 118 expands into the hollow inner channel, which can help deliver injected medicinal agents by making a path 140 through the regenerated bone tissue in the hollow inner channel after implantation.

In the present invention, the lower portion 104 of the implant may preferably have one or more self-tapping cuts 116 formed at the front end thereof in a tapering conical shape so as to facilitate the insertion of the implant into the bored hole in the bone tissue. The tapering cuts can be longitudinal cavities having cutting faces with cutting edges to provide self-tapping. A cutting edge may have a plurality of cutting teeth. Other suitable types of self-tapping cuts can also be used. In addition, these cutting edges can provide more implant-bone interface areas for osseointegration.

EXAMPLES

Hereinafter, the present invention will be described in further detail with reference to examples. It will be obvious to a person having ordinary skill in the art that these examples are for illustrative purposes only and are not to be construed to limit the scope of the present invention.

Example 1: Manufacture of Integrated Hybrid Dental Implant

An implant having a size of 03.5×10 mm was manufactured of grade 4 titanium. As shown in FIG. 1, a screw body was integrally manufactured with a prosthesis section, i.e., an upper element of the implant, and a hollow inner channel was formed at a middle portion of the implant. The hollow inner channel was fluidically connected with the outside, and side openings were formed at the hollow inner channel by a mechanical method, which may be paths of an injectable drug. The side openings were formed in two pairs which confront each other (a total of four side openings) in such a manner as to have a helical shape which transverse across turns of an external thread.

Experimental Example 1: Mechanical Property of Novel Hybrid Implant

A test of the mechanical strength of the hybrid implant manufactured in the above Example 1 was performed. A new implant was placed on a loading device according to the international standards (ISO 14801) for testing the mechanical strength of the hybrid dental implant.

Figure 7:
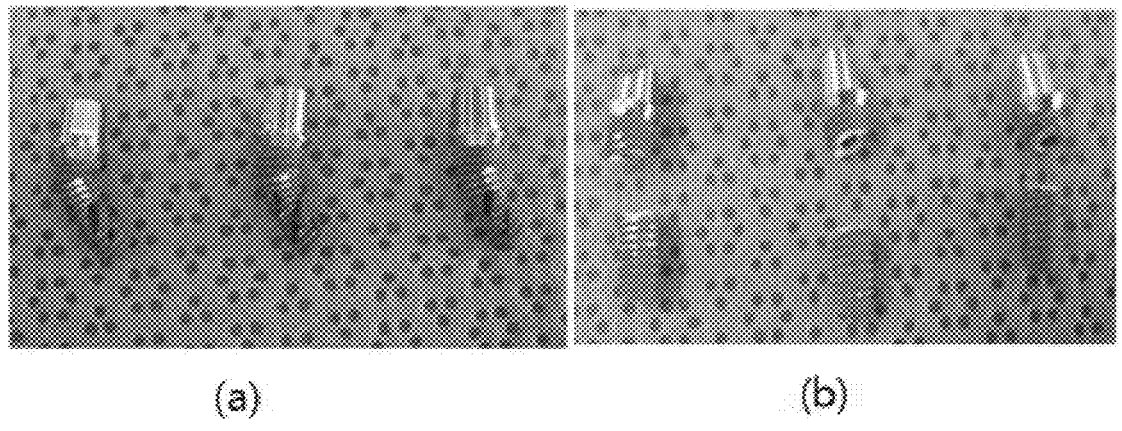
FIG. 7 shows an analysis of the effects of the side openings of the inventive implant, wherein image (a) shows an experimental result of a hybrid dental implant formed with side openings, and image (b) shows an experimental result of a hybrid dental implant not formed with side openings.

In addition, for the purpose of comparison, an implant was manufactured in the same manner as in Example 1, except that the side openings are not formed at the hollow inner channel, and the effects of the side openings on the strength of the implant were measured. As shown in Table 1, a static compressive force was applied to the implant placed on the loading device three times until the implant was broken. As shown in FIG. 7, Table 1 showed the strength of an average of 1500 N of the force values measured nearly equally in two test groups, irrespective of the presence or absence of the side openings. In the meantime, fracture did not appear at the implant having the side openings, but fracture occurred at the implant having no side openings and thus the implant was broken (FIG. 7). This mechanical testing result indicates that when a strong force is applied to the upper element of the implant having the side openings, the side openings function to buffer an impact applied to the implant.

TABLE 1

| Testing frequency | Force applied (N) | |
|---|---|---|
| | Presence of side openings | Absence of side openings |
| 1 | 1490 | 1486 |
| 2 | 1504 | 1520 |
| 3 | 1503 | 1685 |
| Average | 1499 | 1564 |
| Deviation | 8 | 106 |

Figure 5:
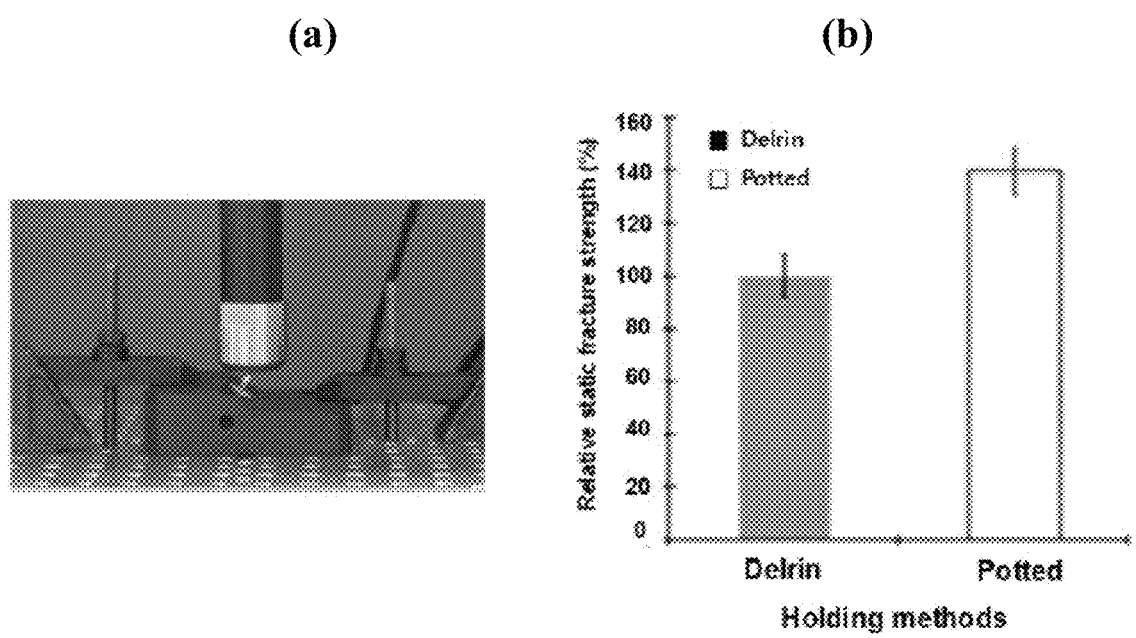
FIG. 5 in image (a) shows results of a fracture test for the implant of FIG. 1, specifically the loading conditions following ISO 14801, and in image (b) shows a graph of the relative strength of the implant screwed in Delrin® polyoxymethylene homopolymer and potted into polymethyl methacrylate (PMMA) bone cement that penetrates into the side openings of the implant during curing.

Comparative Example 1: Comparison of Mechanical Property Between the Inventive Implant and Conventional Implant The hybrid dental implant disclosed in U.S. Patent Publication No. 20050230889 was manufactured of grade 4 titanium, and an experiment was performed in the same manner as in the above Experimental Example 1 using the implant manufactured to a size of 03.5×13 mm. One group of implants was installed into a resin, after drilling and tapping the polymer resin (Delrin). The other group of implants were potted using polymethyl methacrylate (PMMA) bone cement that penetrates into the side openings of the implant during curing, which simulates regeneration of bone tissues after bone ingrowth into the hollow inner channel of the implant. A static compressive force was applied to the potted implant until fracture. The PMMA potted group had significantly higher static strength than the Delrin group (p<0.005, n=3 for each group) (FIG. 5(b)). This mechanical testing result indicates that bone ingrowth into the openings of the implant will increase mechanical stability of the implant system. Fracture occurs at the abutment connection, but not within the implant, as usually observed in the traditional solid implant system in which a tooth abutment and an implant screw body are separated from each other under a static fracture loading.

As shown in Table 2, the conventional implant of the Comparative Example 1 suggests that fracture occurred at a connection portion of the implant screw and the prosthesis, and the new hybrid dental implant in Example 1 is 6-fold higher than the conventional implant in Comparative Example 1 in terms of the strength causing the fracture.

TABLE 2

| Testing frequency | Force applied (N) | |
| --- | --- | --- |
| | Example 1 | Existing Patent (U.S. Pat. No. 20150230889) |
| 1 | 1490 | 256 |
| 2 | 1504 | 234 |
| 3 | 1503 | 265 |
| Average | 1499 | 252 |
| Deviation | 8 | 16 |

Experimental Example 2: Examination of Effects of Hybrid Dental Implant

This study examined not only the effects of the hybrid dental implant of Example 1 as a functional scaffolding and for the local delivery of an effective dose of BMP and medication loaded in hydrogel, but also whether it can enhance quantity and quality of bone regeneration surrounding the implant implanted.

(1) Experimental Subject

Foxhound dogs (about 2 years old), weighing between 20 and 25 kg were used. All animals in this study were cared for in compliance with NIH publication #85-23 and Guide for the Care and Use of Laboratory Animals. The foxhound dog model has been widely accepted in dental implant- and bone augmentation-related studies.

(2) Experimental Method

The mandibular premolars and first molars were removed and two months of post-extraction healing were allowed. Analgesic and antibiotics were administered to the wound site after exodontia on the day and for three days after the day when the tooth was extracted. In two months after exodontia, following a buccal incision, full-thickness flaps were elevated, and then a hole was formed in the mandible using a trephine drill for implantation and the test group implants and the control group implants were divided into right and left, followed by implantation of three implants of each test group. After implantation of the implants, the cover screws were connected to only the test group implants, and a plastic cap was covered on both the test group implants and the control group implants and the incised site was sutured for closure and allowed to heal. Analgesic and antibiotics were administered to the wound site after surgery on the day and for three days after the day when the surgery was performed, and soft food was supplied for three days after surgery. Then, dry food was supplied for one or two days, and the surgical site was observed at least once at each 24 hours during the raising period of the animals. A total of 23 implants (test group 12, control group 11, Ø3.5 mm×8.5 mm) were used in this test.

Radiography was taken at the implantation sites to record baseline peri-implant bone levels. To label newly formed bone tissue, alizarin red (30 mg/kg) and calcein green (10 mg/kg) were intravenously injected at four and two weeks after surgery, respectively. After three and six weeks of healing, animals were sacrificed via intravenous injection of calcium chloride overdose. The results of the test were shown in FIGS. 8 and 9, respectively.

(3) Experimental Results

Figure 6:
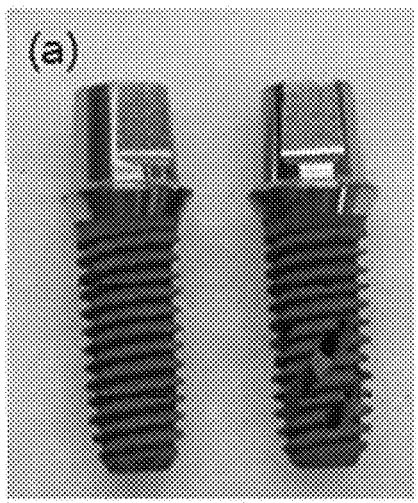
FIG. 6 shows the results of a comparative experiment between the inventive implant (new implant) and a conventional implant (control), wherein image (a) shows the outer appearances of the implants prior to the implantation, image (b) shows a section of the conventional implant observed at six weeks after implantation of the implant, image (c) shows a section of the inventive implant prior to removal of a cover screw at six weeks after implantation of the inventive implant, and image (d) shows a section of the inventive implant following removal of a cover screw at six weeks after implantation of the inventive implant.
Figure 6:
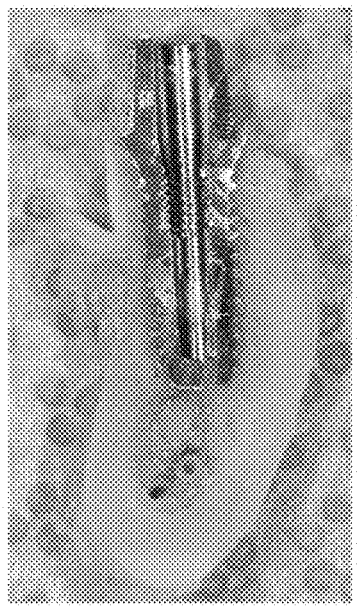
Figure 6:
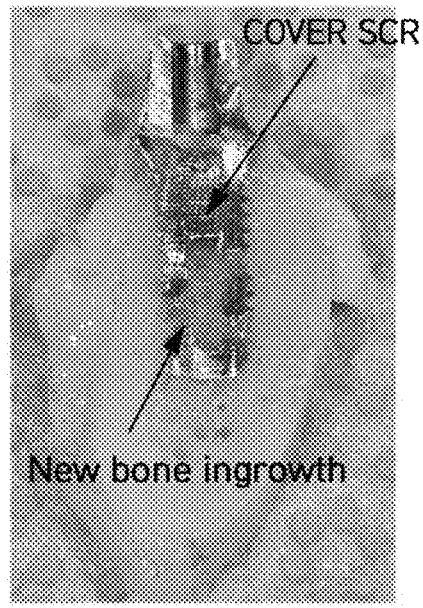
Figure 6:

As shown in FIG. 6, it can be seen that the surrounding bone tissue was not grown into the implant having no the side openings (FIG. 6(b), but bone tissue was grown into the implant through the side openings in the implant having the side openings, and grown bone tissue was filled even in the hollow inner channel. This bone ingrowth into the implant having the side openings serves to further firmly connect the implant and the surrounding bone, thus preventing inflammation including peri-implantitis arising from the movement of the implant by a masticatory impact.

In addition, as shown in FIG. 6(c), it can be seen that in the case where the injection of additional medicinal agents is needed even after ingrowth of the surrounding bone into the implant, when the cover screw is removed from the upper element of the implant (FIG. 6(d), a space for injecting a hydrogen or drug was created.

Figure 8:
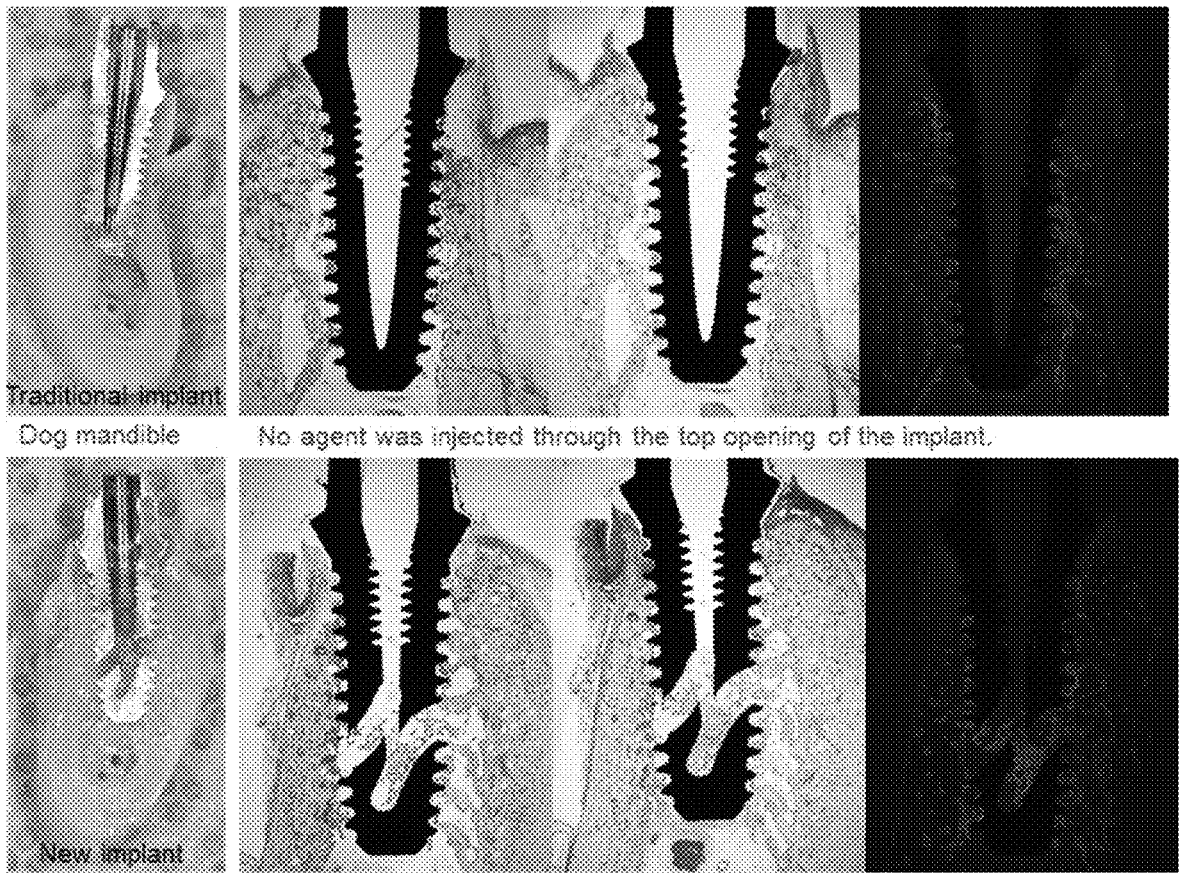
FIG. 8 is a result of a comparative experiment between the inventive implant (new implant, below) and the conventional implant (traditional implant, above), which are respectively implanted into the dog mandible, i.e., a photo of sections of the both implants and staining with alizalin red, observed at three weeks after implantation of the implants.
Figure 9:
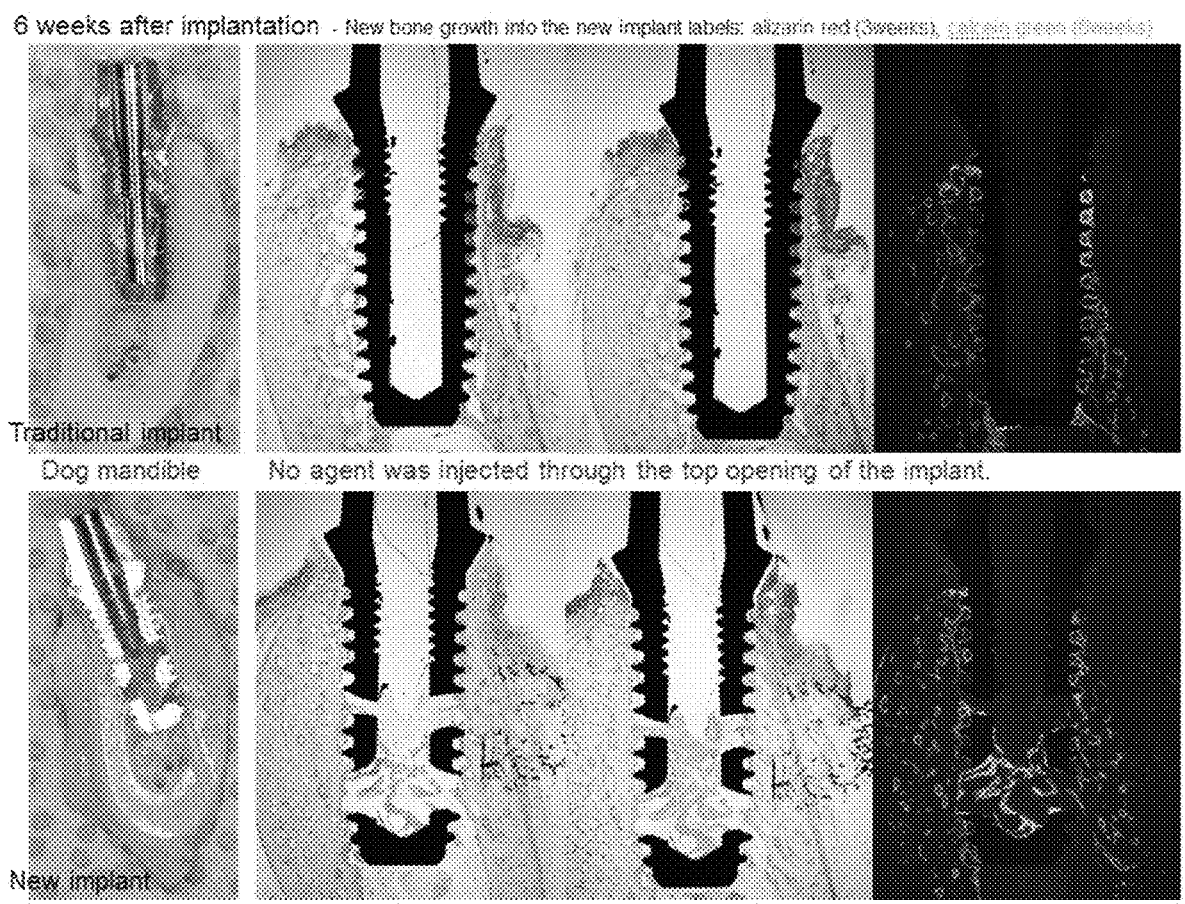
FIG. 9 is a result of a comparative experiment between the inventive implant (new implant, below) and the conventional implant (traditional implant, above), which are respectively implanted into the dog mandible, i.e., a photo of sections of the both implants and staining with alizalin red and calcein green, observed at six weeks after implantation of the implants.

As shown in FIGS. 8 and 9, alizalin red was injected into living adult dogs at three weeks after implantation of the implant, and calcein green was injected prior to sacrifice of the animals at six weeks after implantation. The test result suggests that a site stained with alizalin red is bone tissue grown for three weeks after implantation, and bone tissue was continuously grown at a site stained with calcein green until six weeks after implantation.

FIG. 8 shows a photo obtained by staining bone tissue grown newly after injecting alizalin red into living adult dogs at three weeks after implantation of the implant. This photo indicates that new bone tissue was grown into the hollow inner channel within a short period of time after implantation.

As shown in FIG. 9, alizalin red was injected into living adult dogs at three weeks after implantation of the implant, and calcein green was injected into the same dogs prior to sacrifice of the animals at six weeks after implantation. The test result distinctly suggests that a site stained with alizalin red is bone tissue grown for three weeks after implantation, and bone tissue was continuously grown at a site stained with calcein green until six weeks after implantation.

It can be seen from the results of FIGS. 8 and 9 that the surrounding bone tissue is not grown into the conventional implant, whereas the surrounding bone tissue is grown into the inventive implant through the side openings and bone tissue is filled even into the hollow inner channel.

INDUSTRIAL APPLICABILITY

The integrated hybrid dental implant according to the present invention enables a drug to be supplied to the area around the implantation site so as to induce bone regeneration in the implant after the implant has been implanted into a bone-deficient site, has an excellent mechanical strength despite the presence of the openings, and allows the screw body to be integrally formed with the prosthesis section to exhibit more excellent mechanical strength so that the implant can be useful as a dental implant.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

What is claimed is:

1. An integrated hybrid dental implant comprising:
   (a) a screw body having a longitudinal axis, and an external thread formed on an external surface of the screw body; and
   (b) a prosthesis section connected at one side thereof to a tooth prosthesis and integrally configured at the other side thereof with the screw body, wherein the implant comprises an upper portion with an open ceiling, a middle portion having a hollow inner channel, and a lower portion with a closed floor, and
wherein the hollow inner channel comprises:
(i) an upper end portion connected to the open ceiling, which is configured to receive one or more injectable bone inducing agents;
(ii) a lower end portion terminating at the closed floor; and
(iii) one or more side openings formed to extend at an angle across at least three turns of the external thread, and in the same direction of the external thread, with said angle being measured between (i) an axis of the opening measured along its direction of extension across the at least three turns of the external thread and (ii) said longitudinal axis of the implant, said angle being in a range of 25° to 50°, and wherein a thread angle, measured between (i) the axis of the opening measured along its direction of extension across the at least three turns of the external thread, and (ii) the external thread measured along its direction of extension, is in a range of 30° to 60°, wherein the dimensions of the side openings are designed to enable bone ingrowth into the hollow inner channel of the middle portion or bone outgrowth from the hollow inner channel to the surrounding bone, and the side openings are fluidically connected with the hollow inner channel of the middle portion, and
wherein the prosthesis section includes a hollow inner central channel connected with the hollow inner channel of the screw body and the hollow inner central channel of the prosthesis section and the hollow inner channel of the screw body comprise a drug carrier embedded therein to enable a continuous drug supply into the hollow inner channel of the screw body and the side openings.

2. The integrated hybrid dental implant of claim 1, wherein the upper portion, the middle portion, and the lower portion of the screw body are located successively along the longitudinal direction of the screw body, wherein the upper portion occupies the upper 40% to 50% of the length of the implant other than the prosthesis section, wherein the middle portion occupies the middle 40% to 50% of the length of the implant other than the prosthesis section, and wherein the lower portion is adjacent to the middle portion and occupies the lower 10% to 20% of the length of the implant other than the prosthesis section.

3. The integrated hybrid dental implant of claim 1, wherein the hollow inner channel of the middle portion has a diameter in the range of 0.5 mm to 2.0 mm.

4. The integrated hybrid dental implant of claim 1, wherein the side openings have a width on a surface of the screw body in the range of 0.6 mm to 1.5 mm.

5. The integrated hybrid dental implant of claim 1, further comprising a plug-in screw, a healing cap screw, or an abutment screw connected to the open ceiling, extending into the hollow inner channel of the middle portion.

6. The integrated hybrid dental implant of claim 1, wherein the lower portion comprises one or more self-tapping cuts at a front end thereof.

7. The integrated hybrid dental implant of claim 1, wherein the bone inducing agent comprises bone morphogenetic proteins.

8. The integrated hybrid dental implant of claim 1, wherein the drug carrier is a hydrogel, wherein the hydrogel is loaded with bone inducing agents.

9. The integrated hybrid dental implant of claim 8, further comprising one or more therapeutic agents.

* * * * *